April 21, 1925.

J. B. HADAWAY ET AL 1,534,113

INSOLE REENFORCING MACHINE

Filed Aug. 1, 1919

7 Sheets-Sheet 4

April 21, 1925. 1,534,113

J. B. HADAWAY ET AL

INSOLE REENFORCING MACHINE

Filed Aug. 1, 1919 7 Sheets-Sheet 5

Witness
Jas. J. Maloney.

Inventors
John B. Hadaway
Thomas H. Seely
J Van Everen Fish & Hildreth
Attys

April 21, 1925.  
J. B. HADAWAY ET AL  
INSOLE REENFORCING MACHINE  
Filed Aug. 1, 1919  
1,534,113  
7 Sheets-Sheet 6

April 21, 1925.

J. B. HADAWAY ET AL

INSOLE REENFORCING MACHINE

Filed Aug. 1, 1919

7 Sheets-Sheet 7

Patented Apr. 21, 1925.

1,534,113

UNITED STATES PATENT OFFICE.

JOHN B. HADAWAY, OF SWAMPSCOTT, AND THOMAS H. SEELY, OF MALDEN, MASSACHUSETTS, ASSIGNORS TO UNITED SHOE MACHINERY CORPORATION, OF PATERSON, NEW JERSEY, A CORPORATION OF NEW JERSEY.

INSOLE-REENFORCING MACHINE.

Application filed August 1, 1919. Serial No. 314,688.

*To all whom it may concern:*

Be it known that we, JOHN B. HADAWAY and THOMAS H. SEELY, citizens of the United States, residing at Swampscott, in the county of Essex, Commonwealth of Massachusetts, and Malden, in the county of Middlesex, Commonwealth of Massachusetts, respectively, have invented certain new and useful Improvements in Insole-Reenforcing Machines; and we do hereby declare the following to be a full, clear, and exact description of the invention, such as will enable others skilled in the art to which it appertains to make and use the same.

This invention relates to insole reenforcing machines and more particularly to machines designed to apply the reenforce material to what are known as "Gem" insoles.

The invention is designed primarily to facilitate the application of the reenforce material and to so unite it with the sole that the usual supplemental rib tightening or tightening and molding operation is unnecessary. The invention is also designed to facilitate the trimming of the reenforce material within the edge of the feather.

For the purpose of securing the reenforce material firmly to the rib or lip of the insole and of setting the lip at the proper inclination for subsequent manufacturing operations, the invention, in one aspect, provides not only means for forming a bead in the reenforce material and applying such material to the insole but also means for bending the insole rib inward and means for beating the rib against the surface of the sole. Moreover, for the trimming of the reenforce material, the invention also provides a trimming knife blade arranged to act on the material within the edge of the feather together with means for causing the cutting stroke of the blade to take place during and in the direction of feed.

These and other features of the invention including various combinations and arrangements of parts will more fully appear from the following description of a preferred embodiment of the invention and will then be particularly pointed out in the claims.

Figure 1:
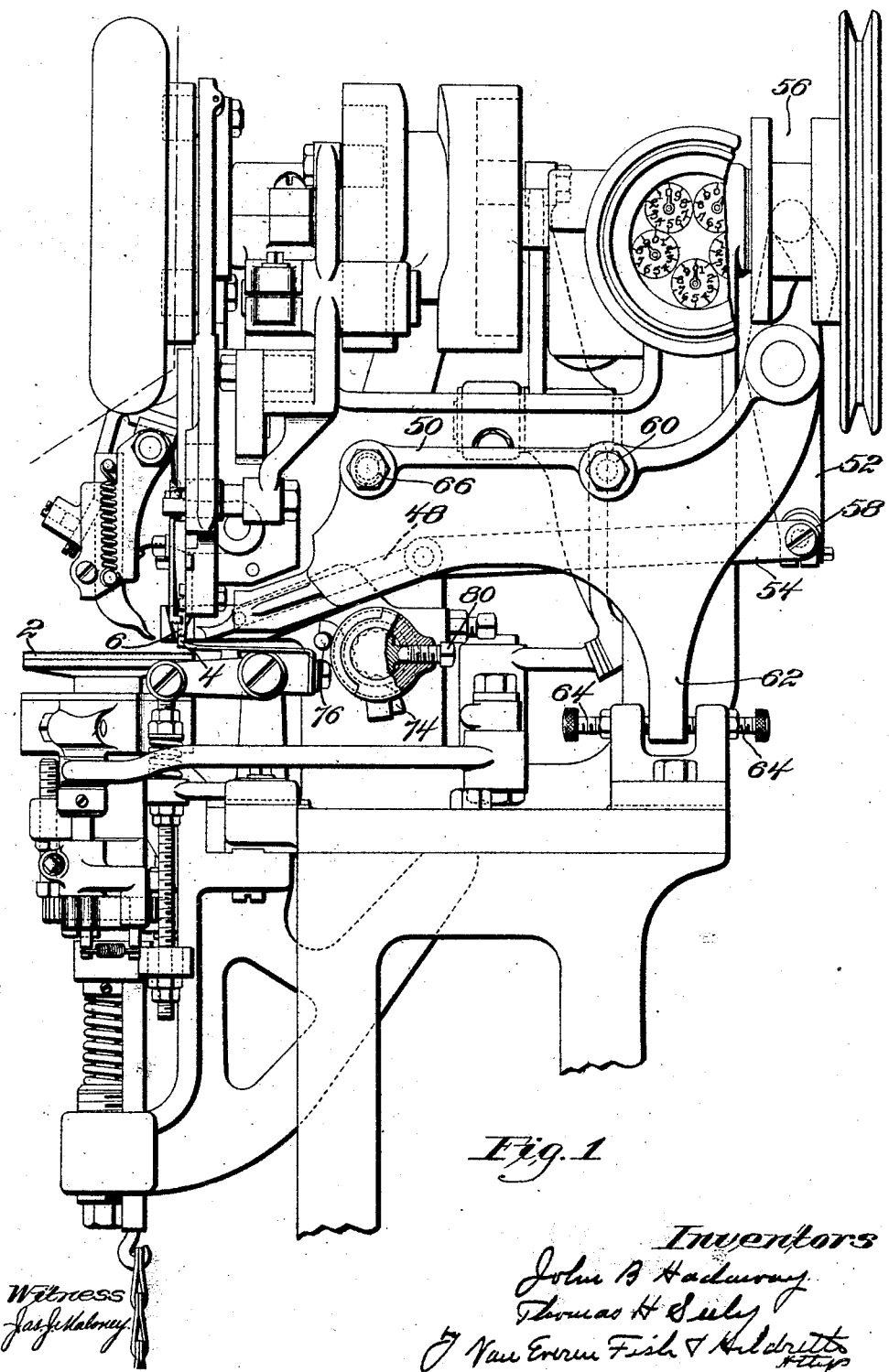
Figure 2:
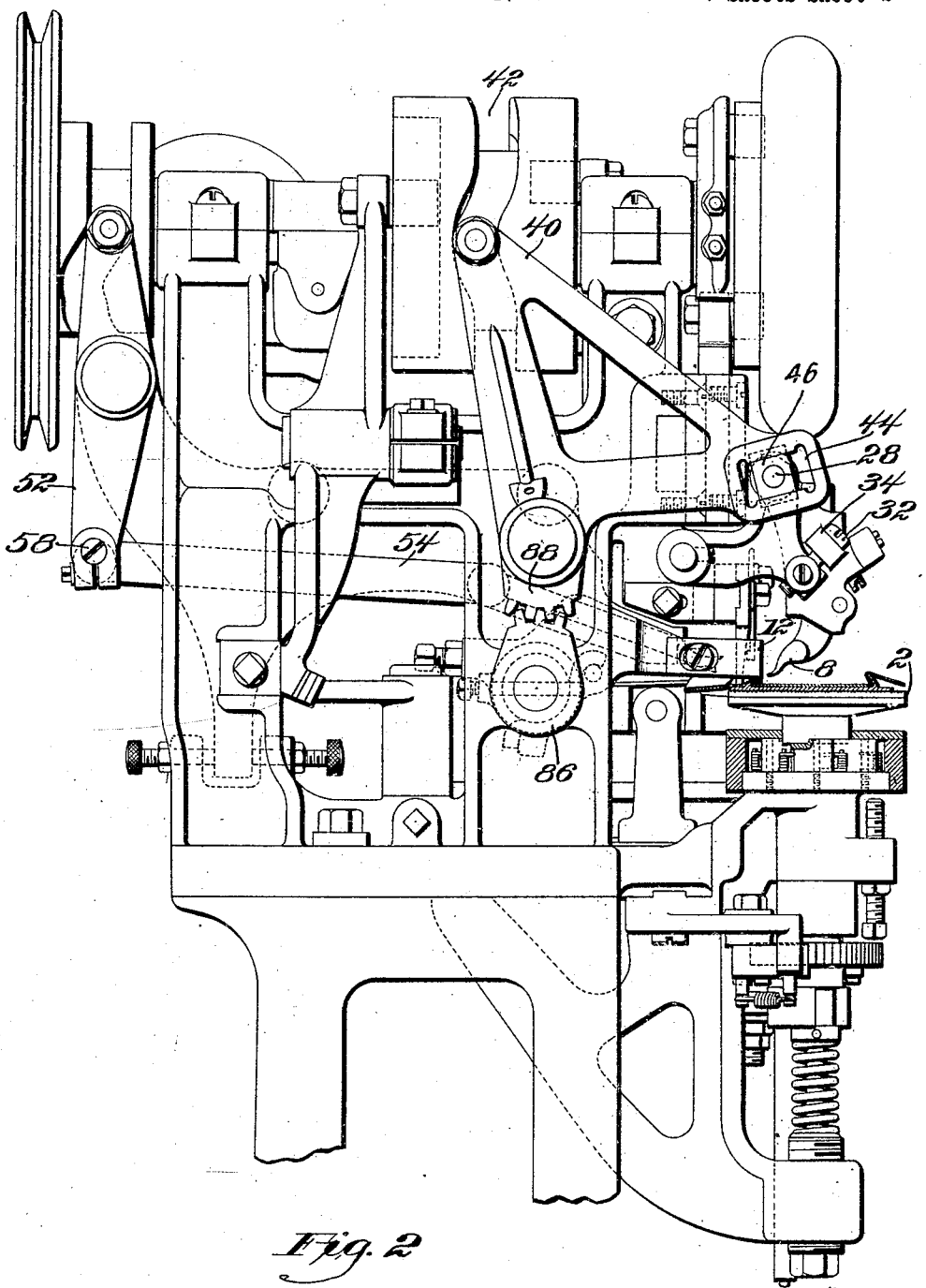
Figure 3:
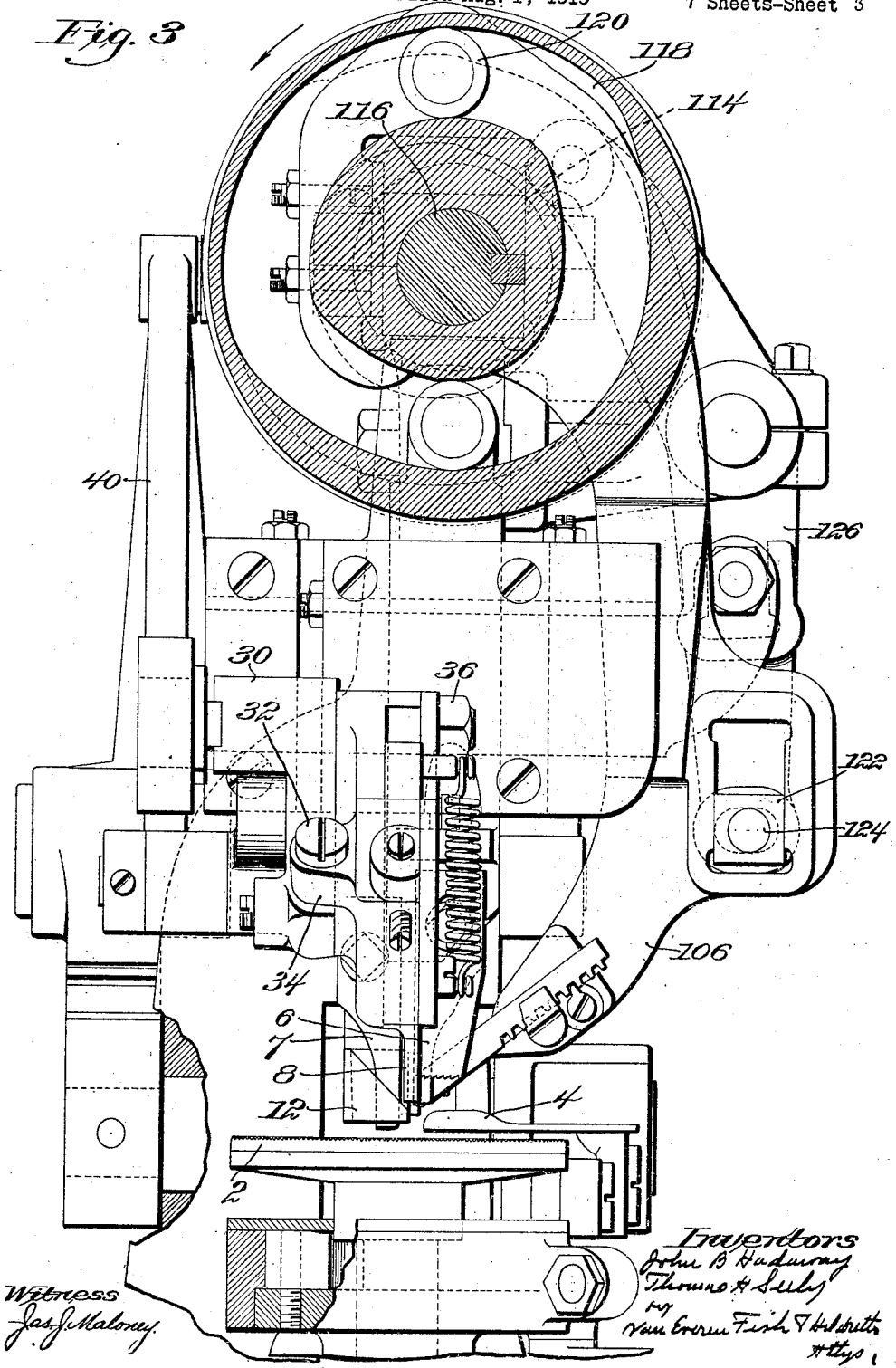
Figure 4:
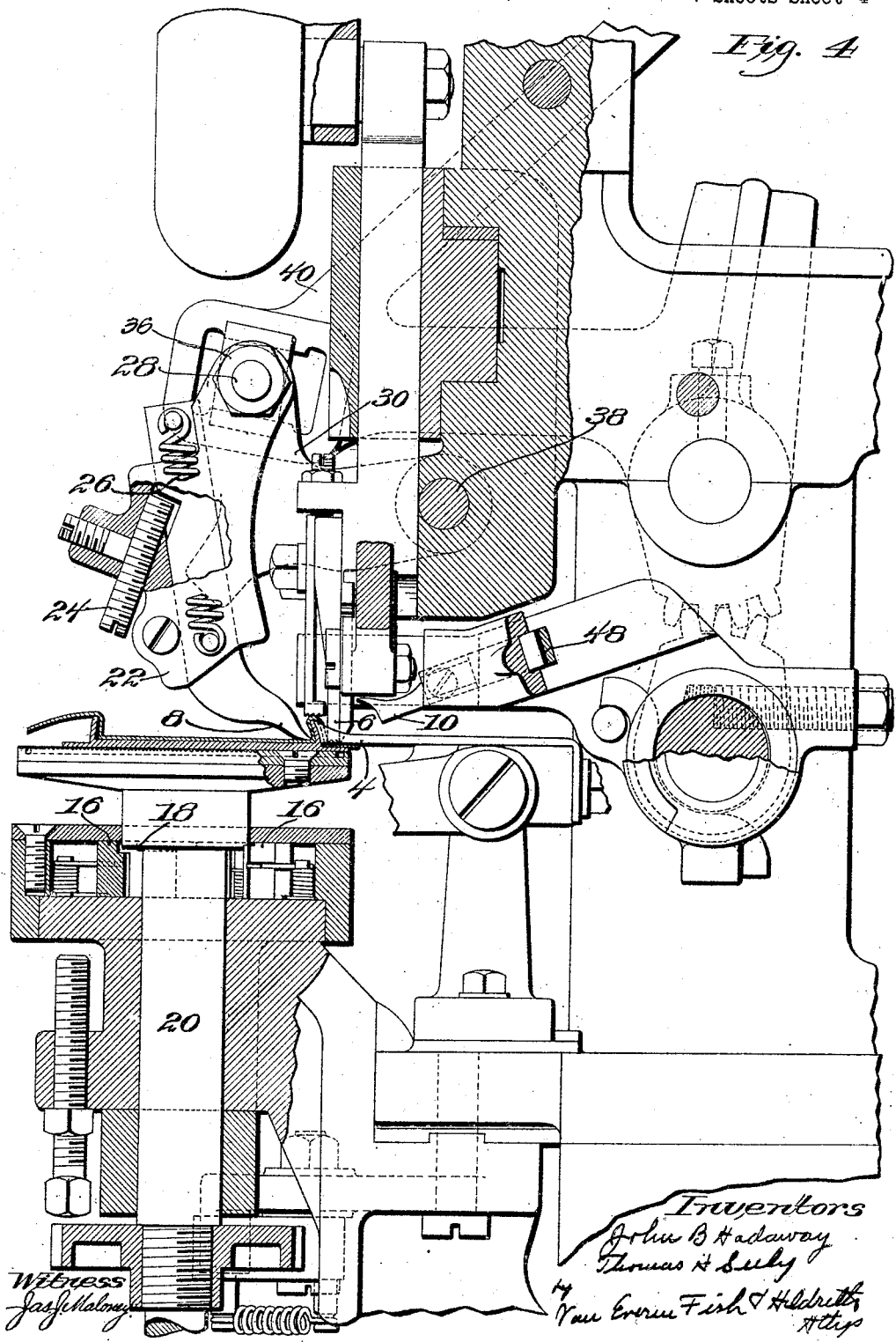
Figure 5:
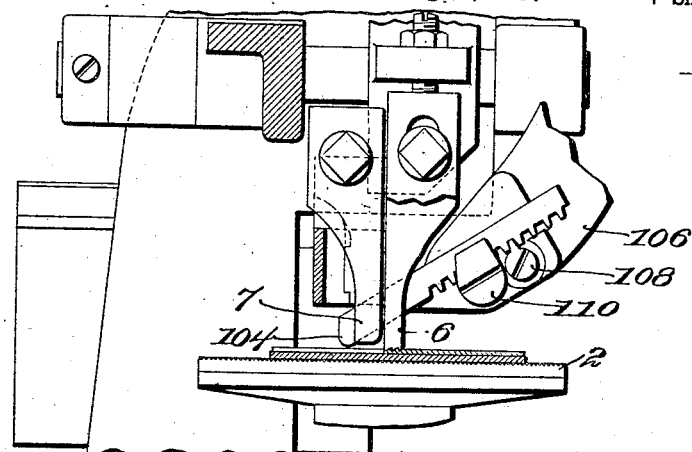
Figure 6:
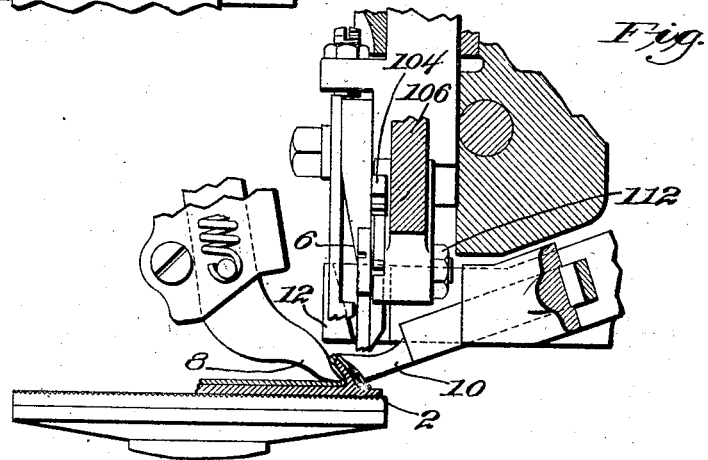
Figure 7:
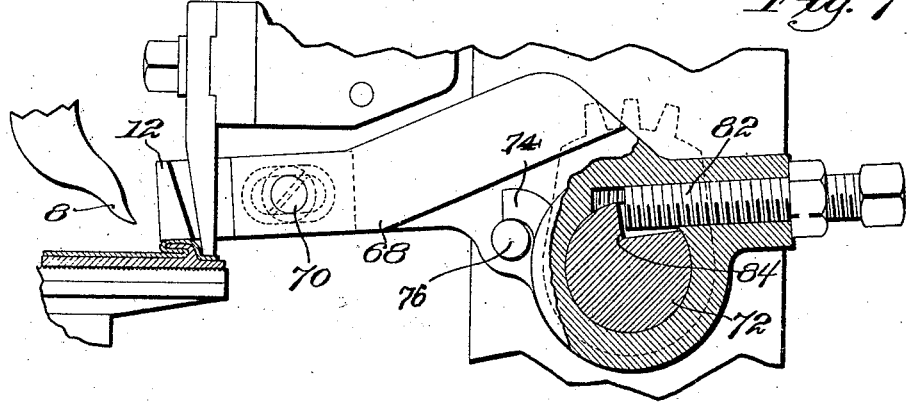
Figure 8:
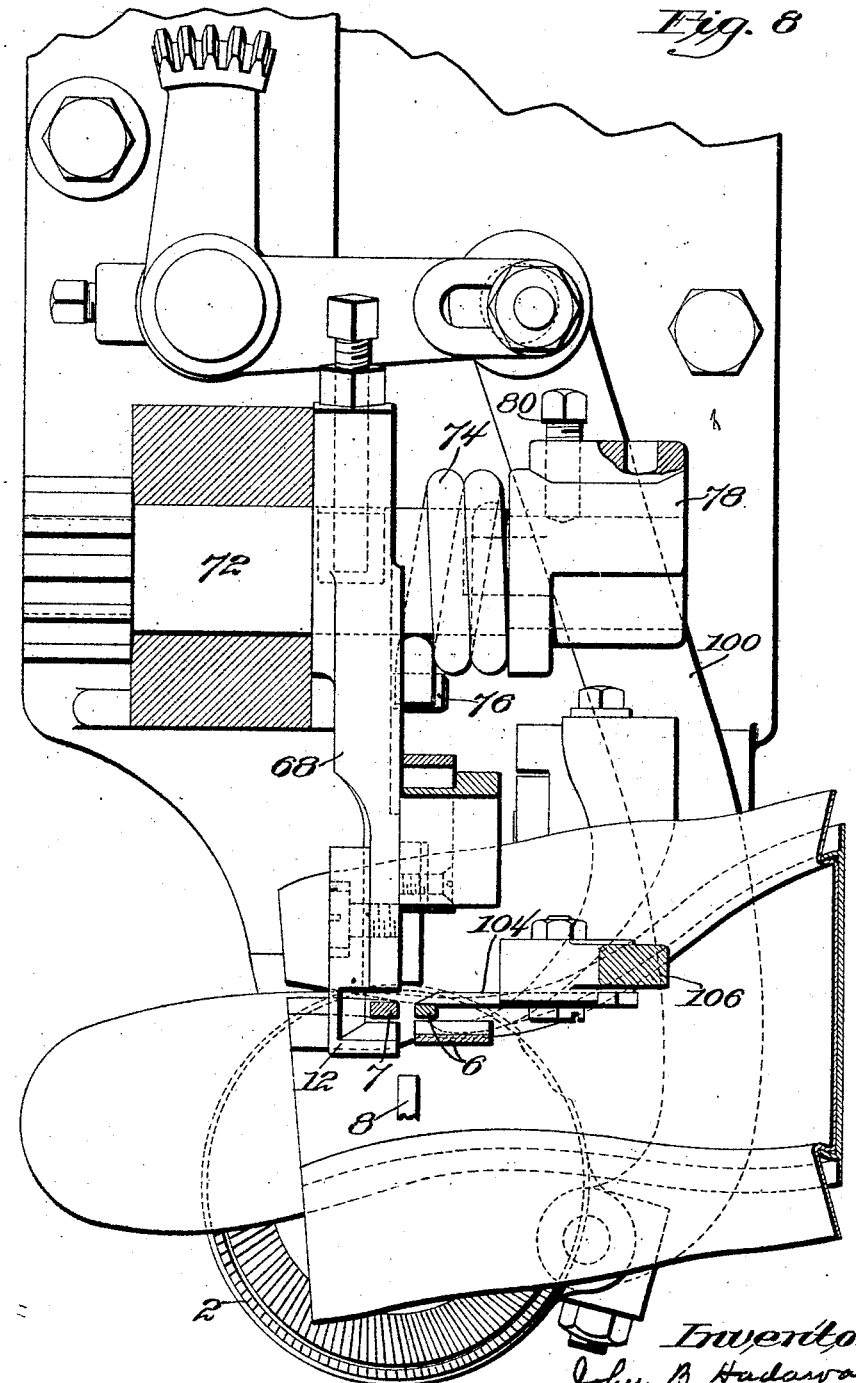
Figure 9:
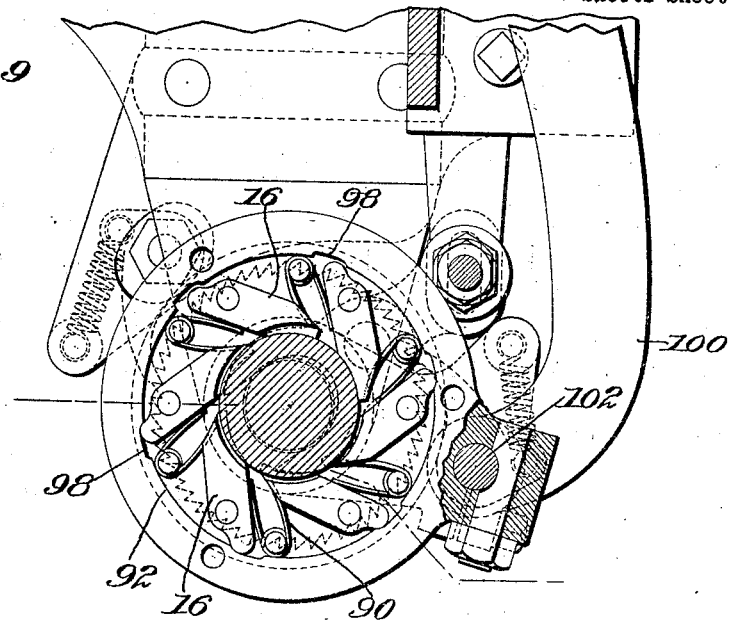
Figure 10:
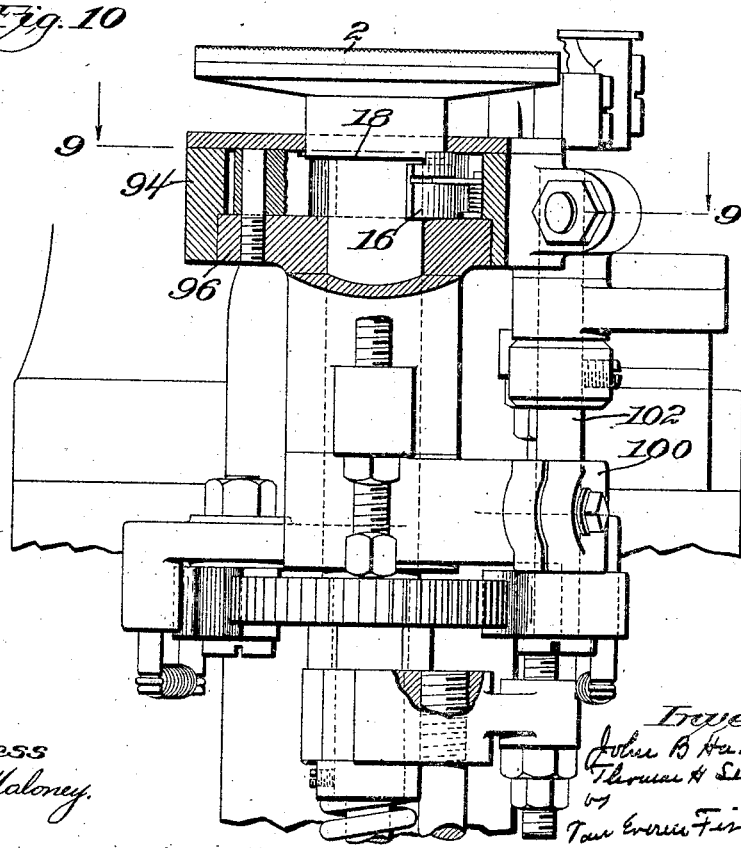

The invention is illustrated in the accompanying drawings in which Fig. 1 is a right hand side elevation of a machine embodying the invention in its preferred form; Fig. 2 is a left hand side elevation of the machine; Fig. 3 is a front elevation with the cam shaft and certain related parts shown in section; Fig. 4 is a right hand side elevation on a somewhat larger scale than Fig. 1 and with a number of parts shown in section; Figs. 5, 6 and 7 are detail elevations showing the mode of operation of the devices acting on the reenforce material; Fig. 8 is a sectional plan view; Fig. 9 is a sectional view on line 9—9 Fig. 10 and Fig. 10 is a sectional elevation showing the feed table locking mechanism.

In the drawings the invention is shown embodied in a machine having the general structure of the machine shown and described in the patent to Hadaway No. 614,860, November 29, 1898. This machine is provided with a vertically movable feed table 2 for supporting and feeding the work, an under former 4 over which the fabric is crimped or folded in forming the bead which envelopes the sole lip, and an outside former 6 which bends the fabric down over the under former and presses it against the feather and which also reciprocates in the line of feed to co-operate with the feed table in feeding the work. These parts are preferably constructed and operated as in the machine of the Hadaway patent. The machine is also provided with a stationary foot 7 against which the feather is normally held by the upward pressure of the table. The devices for applying the reenforce material also comprise an inside former 8 operating to tuck the reenforce fabric into the angle at the base of the lip, an outside former 10 arranged to press the fabric against the outside of the lip and into the angle at the outside base of the lip, and a pressing tool or hammer 12 arranged to press the reenforced lip down against the surface of the sole thereby pressing the fabric firmly against both sides of the lip and also molding the lip so that it will stand at the proper inclination to the sole when the pressure of the tool is removed.

During the operation on the sole the inside forming tool is moved in and presses and holds the fabric snugly in the angle at the inside base of the lip and while the tool is thus holding the fabric the outside forming and feeding tool 6 moves down and folds the fabric down over the under former 4 and over the outside of the lip and presses the fabric against the feather of the sole. The downward movement of the feeding former also depresses the feed table and frees the feather from the stationary foot 7. As the feeding former engages the feather the inside former is retracted slightly so that it does not press against the sole during the feeding of the work. After the feeding is completed the outside former is raised and returned to its initial position preparatory to its next forming and feeding stroke and the inside former is again moved in and tucks the fabric into the inside angle at the base of the lip and also against the inner side of the lip. The outside former 10 then comes forward and the upper part of its working face presses the upper part of the lip against the inside former, as indicated in Fig. 6, thereby bending the lip inward and pressing the fabric firmly against both sides of the lip near its top. The inside former then retracts, and as it retracts the outside former follows it up and the lower edge of the working face forces the fabric snugly into the angle at the outside base of the lip as the top of the lip is bent further inward and is unsupported by the inside former. The pressing tool 12 then acts to beat the reenforced lip firmly against the upper surface of the sole. During the action of the pressing tool the feed table is locked and rigidly supported against the pressure of the tool by one or more of a series of locking pawls 16 arranged to underlie a shoulder 18 on the table or its carrying shaft 20. After the pressing tool has acted the inside former again comes forward and presses the fabric into the angle at the inner base of the lip preparatory to the next downward stroke of the outside feeding former, the inward movement of the inside former being so timed that it acts upon the fabric after the outside former moves down sufficiently to overlie and prevent vertical movement of the projecting edge of the fabric during the action of the inside former.

By the action of the forming and pressing tools the fabric is crimped or folded about the insole lip, and is pressed closely into the angles at the base of the lip and against the surfaces of the lip and feather so that its proper application and final adhesion to the sole is insured, while at the same time the lip may be bent inward and set at the inclination best suited to the performance of the subsequent operations, particularly the sewing of the inseam.

The inside former 8 is mounted to slide vertically in a head 22 and is normally held in engagement with an adjustable stop screw 24 by a spring 26 (Figs. 1, 2, 3 and 4). The head 22 is mounted for horizontal adjustment about a stud 28 on carrier lever 30 and its position on the carrier lever is determined by an adjusting screw 32 passing through a lug 34 on the head and by a clamping nut 36 on the stud 28. The carrier lever is mounted to swing about a stud 38 and is operated by a bell crank lever 40, one end of which carries a roll engaging a cam 42 and the other end of which is provided with a slot 44 embracing a pivot block 46 on the stud 28. The parts are so adjusted that the former engages the reenforce fabric within the lip and then slides along the surface of the sole into the angle at the inside base of the lip thus ensuring the tucking of the fabric snugly into the angle. By adjustment of the stop screw 24 the vertical position of the former within the head 22 may be varied to vary the extent of the sliding movement of the former, and by adjustment of the head horizontally on the carrier lever the path of travel of the former can be varied to suit the soles being operated upon and to secure the proper movement of the former into the angle at the base of the lip and the pressure requisite for properly pressing the fabric into the angle.

The outside former 10 is secured upon the forward end of a bar 48 mounted to slide in a head 50 and actuated through a lever 52, the lower end of which is connected with the bar by a link 54 and the upper end of which carries a roll engaging a cam 56. The guide-way for the bar 48 is preferably so arranged that the forward movement of the former 10 will be at an inclination to the surface of the sole so that the lower edge of the former as it forces the fabric into the angle at the outside base of the lip will apply an effective pressure at the base of the lip tending to bend the lip inward and give it a permanent set. In order that the forward movement of the former may be varied to secure the desired pressure against the outside surface and base of the lip, the rear end of the link 54 is connected to the lever 52 by an eccentic stud 58 adjustably secured in the end of the lever. To adjust the path of movement of the former so that its lower edge will properly register with the angle at the outside base of the lip, the head 50 is supported upon a pivot stud 60 and is provided with an arm 62 engaged by the adjusting screws 64. The head may be securely clamped into adjusting position by a clamping bolt 66 passing through a slot in the head.

The pressing tool 12 is preferably constructed to subject the lip to a hammering or beating action since such action is best suited to ensure the adhesion of the fabric to the sole and to give the reenforced lip the desired permanent set. The work engaging face of the pressing tool is also preferably of a length several times the length of the feed so that the reenforced lip will be repeatedly operated upon by the tool as it advances step by step beneath it. As shown, the tool 12 is adjustably secured upon the forward end of a lever 68 by a clamping screw 70 so that the tool may be adjusted horizontally to bring it into proper register with the lip of the sole being operated upon (Figs. 1, 2, 7 and 8). The lever 68 is loosely mounted on a rock shaft 72 and is yieldingly connected therewith by a heavy coiled spring 74, one end of which engages a pin 76 on the lever and the other end of which is connected to a collar 78 secured to the shaft. The collar may be adjusted on the shaft to vary the tension of the spring and the pressure applied by the tool 12 to the lip and is held in adjusted position by a screw 80 engaging one of a series of notches in the shaft. The normal position of the lever 68 on the shaft is determined by an adjustable stop screw 82 arranged to engage a shoulder 84 on the shaft (Fig. 7). The rock shaft 72 is operated to raise and depress the tool 12 through a gear segment 86 secured to the end of the shaft and engaged by a gear segment 88 on the bell crank lever 40 which operates the inside former 8. Through this connection the tool 12 is forced against the lip during the outward movement of the inside former to full retracted position, the slight movement of the former between successive full retracting movements being insufficient to press the tool against the lip.

The pawls 16 for locking the feed table against downward movement are mounted upon the upper end of the bearing for the feed table shaft 20 and are provided with shoulders of graduated heights adapted to underlie the shoulder 18 formed by the lower edge of the table hub. The pawls are pressed forward by the springs 90 and are retracted to release the table during the feed by cam surfaces 92 formed on the inner surface of a housing 94 which surrounds the pawls and is supported to turn about the bearing 96. The cam surfaces are provided with depressions 98 which are normally in register with the tails of the pawls and permit the pawls to swing inward into locking position. The housing is oscillated to retract and release the pawls through the movement of the feed pawl carrying lever 100 which is connected with the housing through a pivot pin 102. When the feed pawl lever 100 is advanced to give the feed table its feeding movement, the housing 94 is moved to retract the locking pawls before the feed pawl engages a tooth of the cooperating ratchet wheel so that the feed table will be unlocked and will be free to move vertically when the outside feeding former engages the feather of the sole and will remain unlocked during the feed. After the feed has been completed, the feed pawl lever is returned, and during its return movement the housing 94 is moved to bring the depressions 98 into register with the tails of the pawls so that the pawls are free to move in under the shoulder 18 on the table when the table moves upward to press the feather of the sole against the stationary foot 7, and since the pawls are of graduated heights one of them will act to rigidly lock the table at whatever height it may be positioned by the foot 7. The table will therefore rigidly support the sole during the operation of the inside former 8, outside former 10 and pressing tool 12.

The means for trimming the reenforce fabric inside the edge of the feather comprises a knife blade 104 which is given a four-motion movement in the line of feed and which acts to cut the fabric during its movement in the direction of the feed. During each cutting stroke of the knife it therefore cuts toward the previously trimmed or cut part of the fabric so that there is little if any tendency for the fabric to roll or fold up ahead of the knife edge with a resulting displacement or distortion of the fabric. In the construction shown the knife operates during the feeding of the work and is given its cutting movement through connection with the feed cam lever which reciprocates the outside feeding former. As shown in Figs. 3 and 5 the knife blade is carried in the lower end of a knife carrying lever 106 and may be adjusted therein by means of a shaft 108 having a tooth arranged to engage teeth formed on the blade. The blade is secured in adjusting position by a clamping bolt 110 and a nut 112. The upper end of the cutter lever is mounted to slide vertically on a pivot block 114 which is free to turn on the cam shaft 116 of the machine and the lever is moved vertically to raise and lower the knife blade by a cam 118 engaging a roll 120 on the lever. The lever is swung about the cam shaft 116 to advance and retract the knife blade by a pivot block 122 engaging a slot in the lever and carried by a stud 124 adjustably secured in the lower end of the feed cam lever 126. The connections are such that the knife blade will be depressed and will be moved forward during the forward movement of the feeding former but at a greater speed and to a greater extent. The cutting blade will therefore move forward with relation to the fabric during the feed and will trim the edge of the fabric while the fabric is firmly held by the feeding former, the drawing action of the knife being toward the slit previously cut in the fabric by the preceding cutting stroke of the knife.

While it is preferred to employ the specific construction and arrangement of parts shown and described, particularly in embodying the invention in the machine of the Hadaway patent, it will be understood that this construction and arrangement is not essential to the broader features of the invention and may be varied or modified as found desirable or best suited to the machine in which the invention is to be embodied.

What is claimed is:

1. An insole reenforcing machine having, in combination, means including inside and outside formers and an under former for forming a bead in the reenforce fabric and for applying it about the insole lip and a transversely reciprocating outside former mounted to move in a path inclined to the surface of the sole.

2. An insole reenforcing machine having, in combination, means for forming a bead in the reenforce fabric and for applying it about the insole lip including a transversely movable inside former and a vertically and longitudinally movable outside former and a supplemental transversely reciprocating outside former having a working face adapted to bend the lip inward towards the center of the sole.

3. An insole reenforcing machine having, in combination, means including inside and outside formers and an under former for forming a bead in the reenforce fabric and for applying it about the insole lip, a transversely reciprocating outside former having its lower edge arranged to apply an oblique lip setting pressure to the base of the lip, and means for trimming the reenforce fabric.

4. An insole reenforcing machine having, in combination, means for forming a bead about the insole lip, including a reciprocating inside former, a transversely movable outside former, and means for actuating the formers to press the top of the reenforced lip between them and for thereafter actuating the outside former to bend the lip inward and apply pressure at its base while the inside former is reciprocated.

5. An insole reenforcing machine having, in combination, an inside former, means for advancing and retracting it to force the reenforce fabric into the inside angle at the base of the lip, an outside former, and means for advancing it to press the lip against the inside former, and then after the inside former has retracted, continuing its advance to bend the lip inward and press the fabric into the outside angle.

6. An insole reenforcing machine having, in combination, an inside former, a transversely reciprocating outside former having a working face adapted to bend the lip inward and means for actuating the outside former to apply pressure to the lip when unsupported by the inside former.

7. An insole reenforcing machine having, in combination, an outside former mounted to reciprocate transversely in a plane inclined to the surface of the sole, means for varying the forward movement of the former and means for vertically adjusting its path of movement.

8. An insole reenforcing machine having, in combination, an inside former movable into and out of the inside angle at the base of the lip, a transversely reciprocating outside former and mechanism for giving the outside former a two-step forward movement to press the lip against the inside former and then apply pressure at the outside base of the lip when unsupported by the inside former.

9. An insole reenforcing machine having, in combination, a plurality of outside formers, an oscillating carrier, a head horizontally adjustable on the carrier, an inside former mounted to yield vertically in the head, adjustable means for varying the vertical position of the former in the head, and power mechanism for actuating said formers in proper time relation.

10. An insole reenforcing machine having, in combination, means for forming a bead in the reenforce material and applying it to the rib of an insole and means for bending the entire rib inward and pressing it against the base of the sole.

11. An insole reenforcing machine having, in combination, a work support and means for bending the reenforced lip of an insole inward and pressing its inner face against the surface of the sole supported on the work support.

12. An insole reenforcing machine having, in combination, means for forming a bead in the reenforce material and applying it to an insole, means for bending the rib inward and means for beating the rib against the surface of the sole.

13. An insole reenforcing machine having, in combination, means for forming a bead about the lip of an insole and bending it inward and a vibrating hammer for beating the lip.

14. An insole reenforcing machine having, in combination, a pressing tool arranged to press the reenforcing lip of an insole against the surface of the sole, mechanism for vibrating the tool including a spring for determining the pressure applied to the lip, and means for adjusting the pressure applied to the spring.

15. An insole reenforcing machine having, in combination, means for intermittently feeding a reenforced insole, and a beating tool for beating the reenforced lip against the face of the sole, having a working face several times the length of each feeding movement.

16. An insole reenforcing machine having, in combination, a vertically movable work support, means for bending inward the reenforced lip of an insole supported on the work support and for feeding the work, means for beating the reenforced lip against the surface of the sole, and means for locking the work support against the pressure of the beating means and for unlocking it during the feed.

17. An insole reenforcing machine having, in combination, a vertically movable work support, a stationary foot for determining the working position of the support, bead forming and work feeding means, a vibrating tool for beating the reenforced lip down against the surface of the sole, and means for locking the work support in working position during the action of the vibrating tool and for unlocking it for the feed.

18. An insole reenforcing machine having, in combination, a vibrating hammer arranged to act on the reenforced lip of an insole, a feed table for supporting the sole and means for locking the table during the action of the hammer.

19. An insole reenforcing machine having, in combination, a work-support, a trimming knife blade, a blade carrier above said support, and means for actuating the blade to cut the reenforce material within the edge of the feather and in the direction of the feed.

20. An insole reenforcing machine having, in combination, a work support, a blade carrier above said support, a trimming knife blade in the carrier arranged to act on the reenforce material and located within the edge of the feather, and means for moving the blade both toward and from the feather and also in the line of feed to cause it to cut during its movement in the direction of the feed.

21. An insole reenforcing machine having, in combination, means for feeding the sole and for applying the reenforce material thereto, a trimming knife blade arranged to act on the reenforce material within the edge of the feather and means for giving the blade its cutting stroke during and in the direction of the feed.

22. An insole reenforcing machine having, in combination, means for feeding the sole and for applying the reenforce material thereto, a trimming knife blade, and means for moving the blade in the line of feed at a faster rate than the feed of the sole.

JOHN B. HADAWAY.
THOMAS H. SEELY.